(12) United States Patent
Yang et al.

(10) Patent No.: US 9,379,381 B2
(45) Date of Patent: Jun. 28, 2016

(54) MESOPOROUS SILICON/CARBON COMPOSITE FOR USE AS LITHIUM ION BATTERY ANODE MATERIAL AND PROCESS OF PREPARING THE SAME

(75) Inventors: Jun Yang, Shanghai (CN); Xuejiao Feng, Shanghai (CN); Jingjun Zhang, Shanghai (CN); Longjie Zhou, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 120 days.

(21) Appl. No.: 14/361,450

(22) PCT Filed: Nov. 30, 2011

(86) PCT No.: PCT/CN2011/083243
§ 371 (c)(1),
(2), (4) Date: Sep. 18, 2014

(87) PCT Pub. No.: WO2013/078645
PCT Pub. Date: Jun. 6, 2013

(65) Prior Publication Data
US 2015/0024276 A1 Jan. 22, 2015

(51) Int. Cl.
*H01M 4/13* (2010.01)
*H01M 4/36* (2006.01)
(Continued)

(52) U.S. Cl.
CPC .............. *H01M 4/366* (2013.01); *C01B 33/021* (2013.01); *H01M 4/0428* (2013.01); *H01M 4/0471* (2013.01); *H01M 4/1393* (2013.01); *H01M 4/1395* (2013.01); *H01M 4/386* (2013.01); *H01M 4/587* (2013.01);
(Continued)

(58) Field of Classification Search
CPC ............ C01B 33/021; H01M 10/0525; H01M 2004/021; H01M 4/0428; H01M 4/0471; H01M 4/1393; H01M 4/1395; H01M 4/366; H01M 4/386; H01M 4/587
See application file for complete search history.

(56) References Cited

U.S. PATENT DOCUMENTS

2011/0121225 A1* 5/2011 Posudievsky .......... B82Y 30/00
252/182.1

FOREIGN PATENT DOCUMENTS

CN 102157731 A 8/2011
CN 102214817 A 10/2011

OTHER PUBLICATIONS

Rongguan LV et al., Electrochemical behavior of nanoporous/nanofibrous Si anode materials prepared by mechanochemical reduction, Journal of Alloys and Compounds, Oct. 13, 2009, vol. 490, p. 84-87, ISSN 0925-8388.*
International Search Report corresponding to PCT Application No. PCT/CN2011/083243, mailed Sep. 13, 2012 (English language document) (5 pages).

(Continued)

*Primary Examiner* — Patrick Ryan
*Assistant Examiner* — Ben Lewis
(74) *Attorney, Agent, or Firm* — Maginot, Moore & Beck LLP

(57) ABSTRACT

A silicon/carbon composite comprises mesoporous silicon particles and carbon coating provided on the silicon particles, wherein the silicon particles have two pore size distribution of 2-4 nm and 20-40 nm. A process of preparing the silicon/carbon composite comprises the steps of preparing mesoporous silicon particles via a mechanochemical reaction between $SiCl_4$ and $Li_{3.3}Si_4$ under ball milling and subsequent thermal treatment and washing process, and coating the mesoporous silicon particles with carbon. An anode for lithium ion battery comprises the silicon/carbon composite. A lithium ion battery comprises the silicon/carbon composite.

17 Claims, 5 Drawing Sheets

The XRD profile of the mesoporous Si and Si/C composite

(51) Int. Cl.
    *C01B 33/021* (2006.01)
    *H01M 4/04* (2006.01)
    *H01M 4/38* (2006.01)
    *H01M 4/587* (2010.01)
    *H01M 10/0525* (2010.01)
    *H01M 4/1393* (2010.01)
    *H01M 4/1395* (2010.01)
    *H01M 4/02* (2006.01)

(52) U.S. Cl.
    CPC ... *H01M 10/0525* (2013.01); *H01M 2004/021* (2013.01); *Y02E 60/122* (2013.01)

(56) References Cited

OTHER PUBLICATIONS

Kim, Hyunjung et al., Three-Dimensional Porous Silicon Particles for Use in High-Performance Lithium Secondary Batteries, Angewandte Chemie-International Edition, 2008, 10151-10154, 47, Wiley-VCH Verlag GmbH & Co. KGaA, Weinheim (4 pages).

LV, Rongguan et al., Electrochemical behavior of nanoporous/nanofibrous Si anode materials prepared by mechanochemical reduction, Journal of Alloys and Compounds, 2010, 84-87, 490, Elsevier B.V. (4 pages).

\* cited by examiner

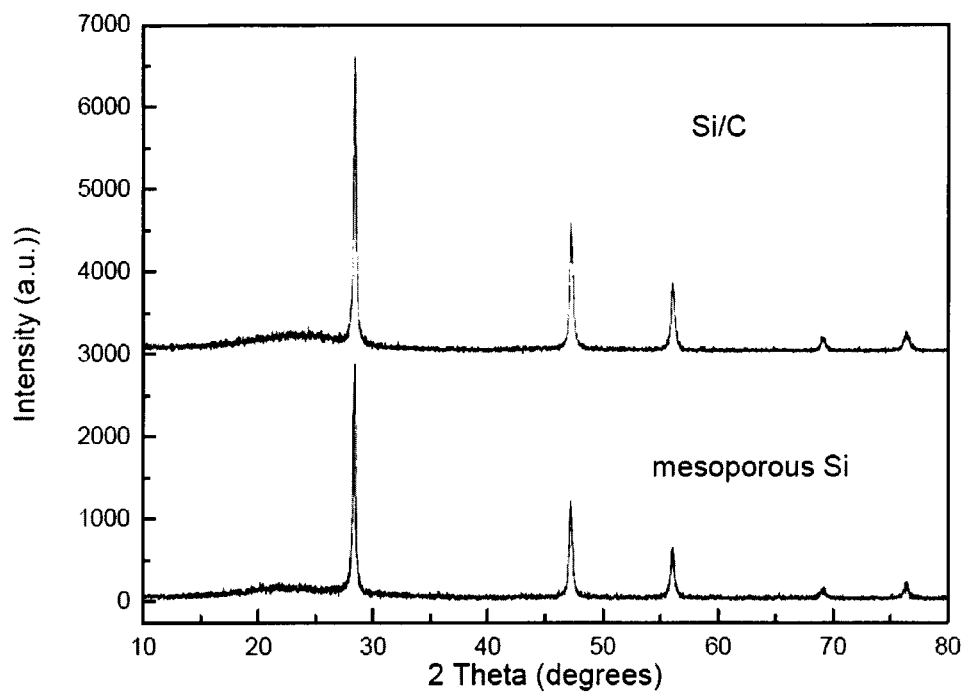
Fig. 1 The XRD profile of the mesoporous Si and Si/C composite
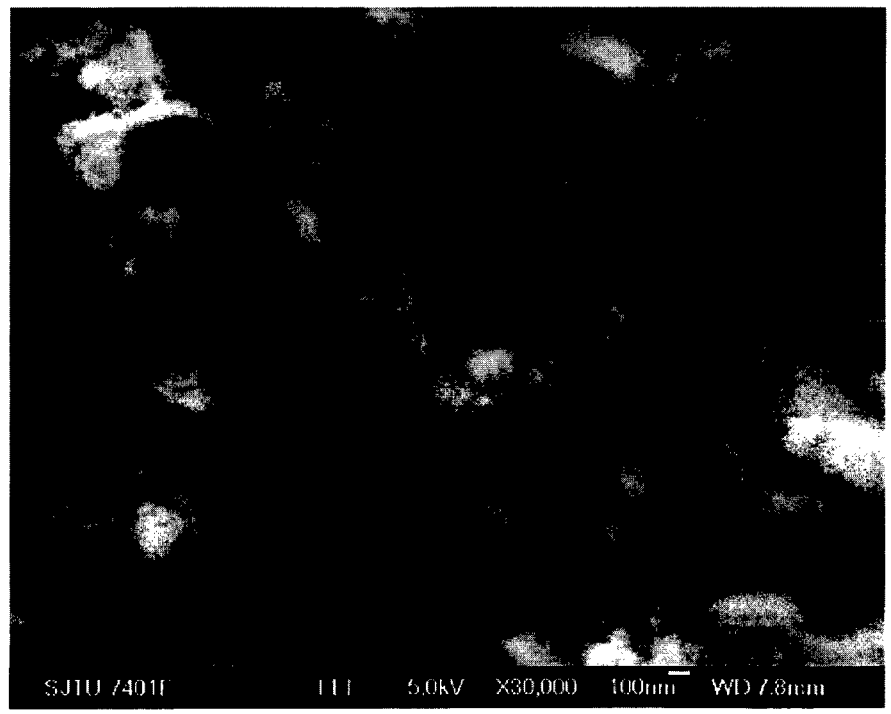
Fig. 2 The SEM image of the mesoporous Si/C composite

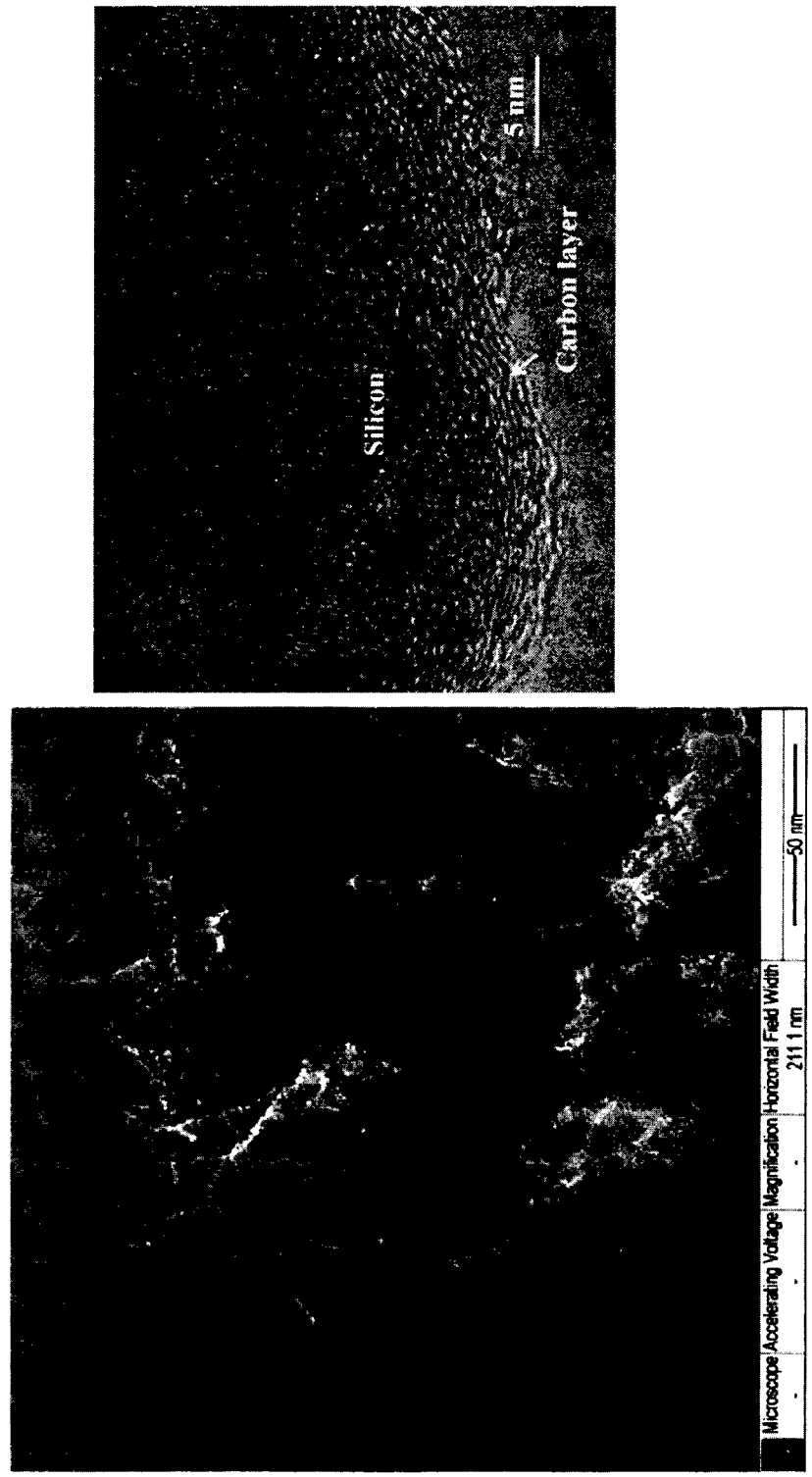
Fig. 3 The TEM image of the mesoporous Si/C composite

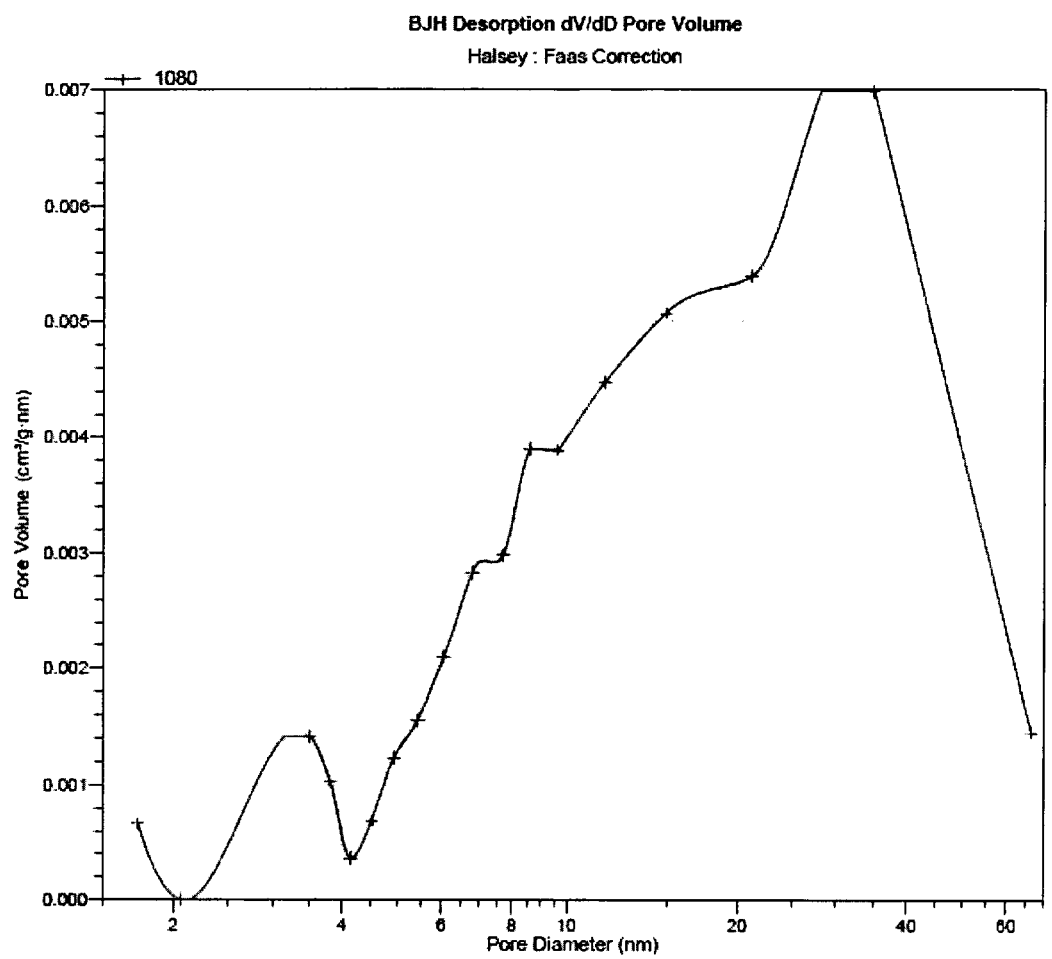
Fig. 4 The pore size distribution of the mesoporous Si

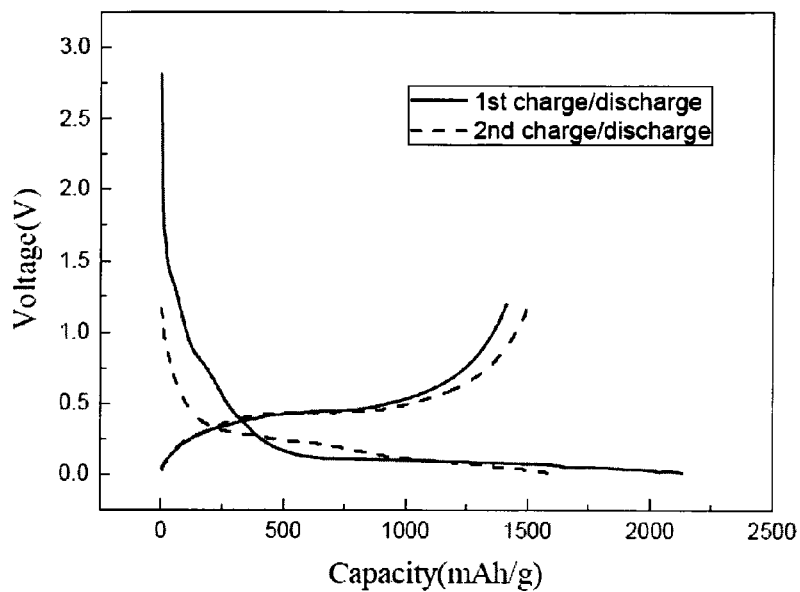
Fig. 5 The first two discharge/charge curves of Si/C composite. The coin cell was discharged at 100 mA·g$^{-1}$ between 0.01 and 1.2V vs Li/Li$^+$.
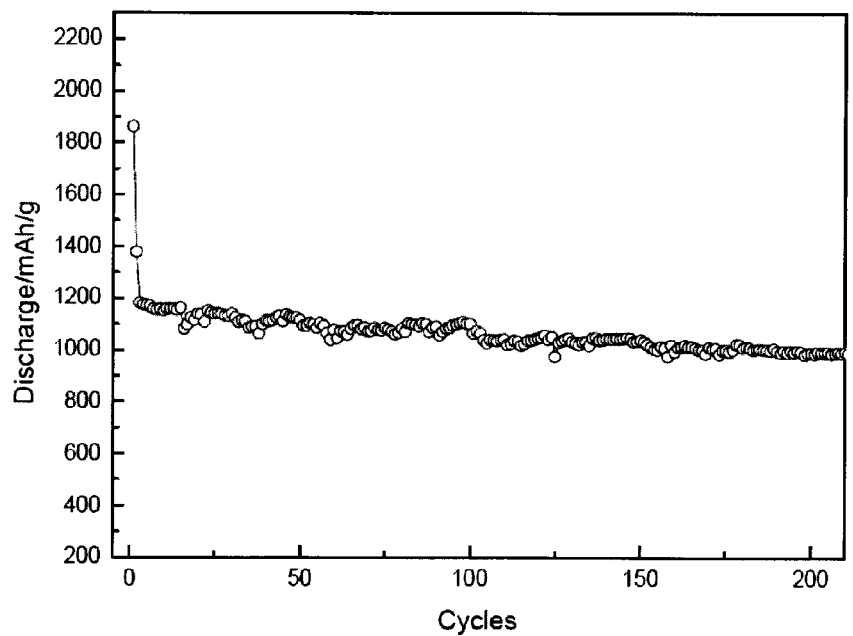
Fig. 6 The cycling performance of the mesoporous Si/C composite. The coin cell was discharged at 300 mA·g$^{-1}$ between 0.01 and 1.2V vs Li/Li$^+$.

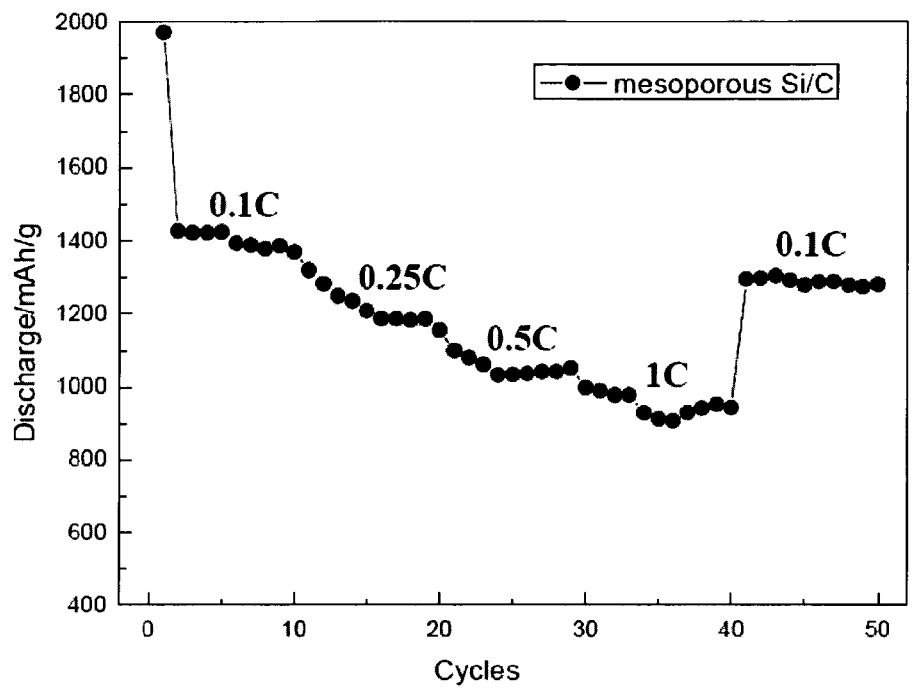
Fig. 7 The rate performance of the mesoporous Si/C composite
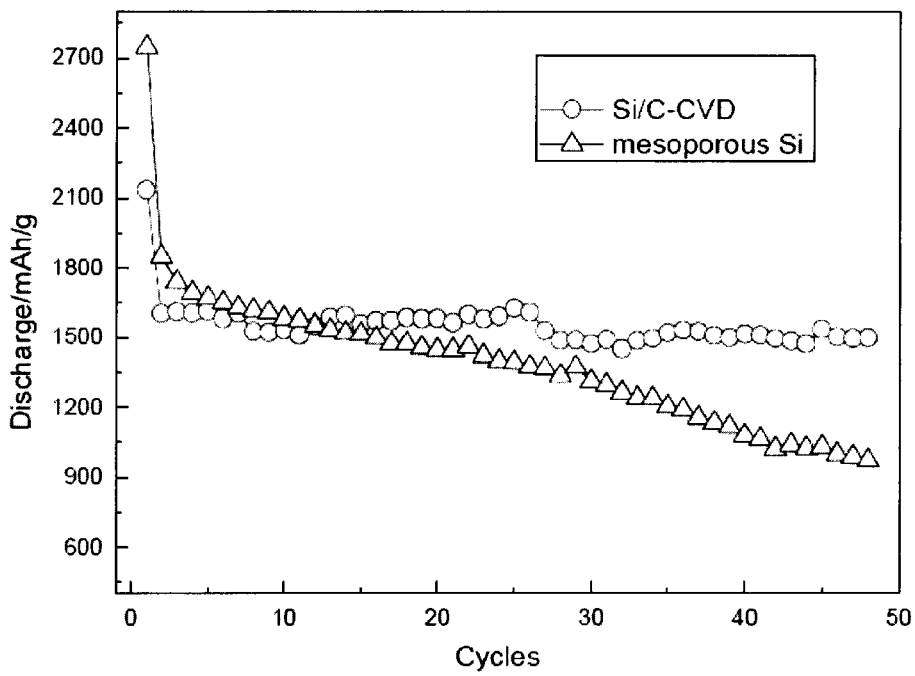
Fig. 8 The cycling performances of the mesoporous Si particles and the mesoporous Si/C composite. The coin cell was charged and discharged at a current density of 100 mA·g$^{-1}$ between 0.01 and 1.2V vs Li/Li$^+$.

MESOPOROUS SILICON/CARBON COMPOSITE FOR USE AS LITHIUM ION BATTERY ANODE MATERIAL AND PROCESS OF PREPARING THE SAME

This application is a 35 U.S.C. §371 National Stage Application of PCT/CN2011/083243, filed on Nov. 30, 2011, the disclosure of which is incorporated herein by reference in its entirety.

FIELD OF THE INVENTION

The present invention relates to a silicon/carbon composite, and a process of preparing the silicon/carbon composite, and also to an anode material for lithium ion battery comprising the composite.

BACKGROUND OF THE INVENTION

One of the most intensively studied anode materials for lithium batteries is Si due to its relatively high theoretical capacity (4200 mA/g, ca. $Li_{4.4}Si$). In spite of the high capacity, silicon exhibits a large volume change (>300%) upon lithium insertion and extraction, which causes pulverization and breakdown of the electrical conductive network, resulting in rapid capacity decay and a rapid decrease in cycling stability.

Recently, many studies have focused on reducing such volume change via coating silicon with lithium ion conducting active carbon phase to prevent the particle aggregation when the particle is pulverized. Various methods, such as pyrolysis or chemical vapor deposition (CVD), ball milling or mechanical milling, chemical reaction of gels, and dehydration of a carbon precursor, have been employed for preparing carbon coated silicon composite. From the viewpoint of uniform structure of carbon layer, CVD is a potential method for lithium ion batteries.

On the other hand, porous structure is an effective way to accommodate the volume change. Some approaches to incorporate porous structures as a buffer zone for volume change, demonstrate another means of accommodating the volume expansions/contractions.

Rongguan Lv et al, in "Electrochemical behavior of nanoporous/nanofibrous Si anode materials prepared by mechanochemical reduction", *Journal of Alloys and Compounds*, 490 (2010), pp. 84-87, prepared a mixture of nanoporous and nanofibrous silicon (NPNF-Si) by a mechanochemical reaction between $SiCl_4$ and $Li_{13}Si_4$ under ball-milling. A nanofibrous and nanoporous structure can be obtained. However, the reversible capacity is relatively low (746.6 $mAh·g^{-1}$) and the capacity was decreased rapidly after 30 cycles.

Hyunjung Kim et al., in "Three-Dimensional Porous Silicon Particles for Use in High-Performance Lithium Secondary Batteries", *Angewandte Chemie-International Edition*, 2008, 120, 10305-10308, reported a template method for the formation of 3D porous bulk Si particles which delivered a reversible capacity of 2800 $mAh·g^{-1}$ at a rate of IC after 100 cycles. The cycling improvement benefits from its highly porous and interconnected structure.

However, the synthetic process is too complicated and expensive. In addition, the method uses a large amount of strong corrosive acid, e.g. hydrofluoric acid, which is toxic and expensive.

There remains a need for a silicon/carbon composite for use as lithium ion battery anode material having excellent capacity and cycling stability, and a soft and simple process of preparing such a silicon/carbon composite using no corrosive acid.

SUMMARY OF THE INVENTION

According to an aspect of the present invention, there is provided a silicon/carbon composite, comprising mesoporous silicon particles and carbon coating provided on the silicon particles, wherein the silicon particles have two pore size distributions of 2-4 nm and 20-40 nm.

According to a further aspect of the present invention, there is provided a process of preparing the silicon/carbon composite, comprising the steps of preparing mesoporous silicon particles via a mechanochemical reaction between $SiCl_4$ and $Li_{13}Si_4$ under balling milling with agate balls in an agate container or with zirconium balls in a zirconium container and subsequent thermal treatment and washing process; and coating the mesoporous silicon particles with carbon.

According to a still further aspect of the present invention, there is provided an anode material for lithium ion battery, comprising the silicon/carbon composite.

According to a still further aspect of the present invention, there is provided a lithium ion battery, comprising the silicon/carbon composite as an anode material.

The Si/C composite according to the present invention shows excellent capacity and cycling stability, which results from mesoporous structure of silicon particles and uniform carbon layer.

BRIEF DESCRIPTION OF THE DRAWINGS

These and/or other aspects and advantages of the invention will become apparent and more readily appreciated from the following description of the invention, taken in conjunction with the accompanying drawings, in which, FIG. 1 is the XRD profile of mesoporous Si particles and Si/C composite prepared according to Example 1.

FIG. 2 is the SEM image of the mesoporous Si/C composite prepared according to Example 1.

FIG. 3 is the TEM image of the mesoporous Si/C composite prepared according to Example 1.

FIG. 4 is a graph showing the pore size distribution of the mesoporous Si particles.

FIG. 5 is the first two discharge/charge curves of the Si/C composite prepared according to Example 1.

FIG. 6 is a graph showing the cycling performance of the mesoporous Si/C composite prepared according to Example 1.

FIG. 7 is a graph showing the rate performance of the mesoporous Si/C composite prepared according to Example 1.

FIG. 8 is a graph showing the cycling performances of the mesoporous Si particles and the mesoporous Si/C composite prepared according to Example 1.

DETAILED DESCRIPTION OF THE PREFERRED EMBODIMENTS

The composite according to the invention comprises mesoporous silicon particles and carbon coating provided on the silicon particles. The silicon particles have two pore size distributions of 2-4 nm and 2040 nm, which can alleviate the silicon volume expansions.

In a preferred embodiment, the carbon coating of the composite according to the invention is applied by chemical vapor deposition.

The thickness of the carbon coating on the mesoporous Si is 5-10 nm.

In the composite according to the invention, the carbon coated on silicon is contained in an amount of 10 to 50% by weight, based on the total weight of the composite.

In a preferred embodiment, the composite further comprises carbon black, more preferably Super P carbon black or acetylene black, and most preferably Super P carbon black. The presence of carbon black can further improve the electronic conductivity and accommodate part of the volume change of silicon during lithium insertion/extraction. In the composite according to the invention, the carbon black is contained in an amount of 5.6 to 12.5% by weight, based on the total weight of the composite.

The composite can be prepared by the process according to the invention, comprising the steps of preparing mesoporous silicon particles via a mechanochemical reaction between $SiCl_4$ and $Li_{13}Si_4$ under balling milling with agate balls in an agate container or with zirconium balls in a zirconium container and subsequent thermal treatment and washing process; and coating the mesoporous silicon particles with carbon.

The mechanochemical reaction is carried out by loading $SiCl_4$ and $Li_{13}Si_4$ into an agate container containing agate balls or a zirconium container containing zirconium balls under inert atmosphere, for example argon gas, and subjecting the mixture to ball milling at a rotation speed of 300-450 rpm for 5-30 hours. Into the mixture, a dispersing agent can be added, to prevent aggregation of powders. The dispersing agent is not particularly limited. In an embodiment, carbon black may be used as the dispersing agent. Suitable examples of carbon black include Super P carbon black and acetylene black. In a preferred embodiment, Super P carbon black is used as the dispersing agent. The weight ratio of $Li_{13}Si_4$: carbon black:$SiCl_4$ can be 0.84:0.05~0.12:2.3~3.4.

The as-milled product is then subjected to a heat treatment, in order to remove excessive $SiCl_4$ and obtain crystalline silicon. In a preferred embodiment, the heat treatment is performed at a temperature of 100-900° C. under inert atmosphere, for example, under a flow of Argon, for 0.5-10 hours.

After the heat treatment, the obtained Si/LiCl is washed with deionized water and isolated, to remove LiCl completely, and then dried, to obtain mesoporous Si particles.

According to the invention, it has surprisingly been found that carrying out the mechanochemical reaction in an agate container or a zirconium container contributes to the formation of the mesoporous structure of the Si particles. This is probably due to the composition of the agate container or zirconium container, which is beneficial to the preparation of mesoporous Si.

Subsequently, the obtained mesoporous Si particles are coated with carbon by using any suitable method, for example, pyrolysis or chemical vapor deposition, to produce the silicon/carbon composite according to the invention. In a preferred embodiment, the coating with carbon is carried out by chemical vapor deposition (CVD). By conducting chemical vapor deposition, a carbon coating can be formed on the surface of the mesoporous Si particles more uniformly.

In a further preferred embodiment, the chemical vapor deposition is performed by introducing the mesoporous Si particles and a carbon precursor in a furnace, increasing the furnace temperature from room temperature to 750-800° C. at a rate of 10° C. $min^{-1}$ and keeping at 750-800° C. for 30-90 min. At the high temperature, the precursor is carbonized and deposited on the surface of Si particles.

The carbon precursor is not particularly limited. Suitable examples of the carbon precursor include toluene and acetylene.

The preparation process according to the invention is simple and soft.

The prepared Si/C composite can be advantageously used as anode material for lithium ion battery. As shown in FIG. 5, the reversible capacity of the composite is about 1400 $mAh \cdot g^{-1}$ at a current density of 100 $mA \cdot g^{-1}$. And a reversible capacity of about 1180 $mAh \cdot g^{-1}$ is obtained when a current density is changed to 300 $mA \cdot g^{-1}$, as shown in FIG. 6. After 240 cycles, the capacity retention is 82.8%, yielding a specific capacity of 977 $mAh \cdot g^{-1}$.

The following examples further illustrate the process according to the invention, and the characteristics of the prepared composite used as anode material for lithium ion battery. The examples are given by way of illustration only, and are not intended to limit the invention in any manner.

Example 1

2 ml $SiCl_4$ (Aladdin-reagent Corp., China, 99.9% pure), 0.84 g $Li_{13}Si_4$ powder (SIMIT, CAS, China) and 0.10 g Super P carbon black (40 nm, Timical) were loaded in an 80 ml argon filled agate vial with 15 agate balls of 10 mm in diameter. The milling was performed on a Planetary Mono Mill P-6 (Fritsch, Germany) at a rotation speed of 450 rpm for 20 h. Then the as-milled product (Si/LiCl) was placed in a quartz tube in an argon filled glove box, and heated to the temperature of 900° C. at the rate of 5° C. $min^1$ under a constant flow of Argon and maintained at 900° C. for 2 h, then naturally cooled down to room temperature. After heat treatment, the Si/LiCl was washed with deionized water and isolated by filter to remove LiCl completely, followed by vacuum drying at 100° C. for 4 h, finally naturally cooled down to room temperature.

The obtained mesoporous Si powder (0.1 g) was loaded in an alundum boat and placed at the center of a quartz tube furnace. Next, argon and toluene were introduced into the furnace at a rate of about 100 L/h. Then, the furnace temperature was increased from room temperature to 800° C. at a rate of 10° C. $min^{-1}$ and kept at 800° C. for 60 minutes. The furnace was cooled slowly to room temperature. At the high temperature, the toluene was decomposed quickly and a carbon coating was deposited onto the surface of Si particles. The weight ratio of the carbon coating on the silicon particles was 25.3 wt. %.

Example 2

The mesoporous Si powder was prepared in the same manner as in Example 1.

The obtained mesoporous Si powder (0.1 g) was loaded in an alundum boat and placed at the center of a quartz tube furnace. Next, argon and toluene was introduced into the furnace at a rate of about 100 L/h. Then, the furnace temperature was increased from room temperature to 800° C. at a rate of 10° C. $min^{-1}$ and kept at 800° C. for 90 minutes. The furnace was cooled slowly to room temperature. At the high temperature, the toluene was decomposed quickly and a carbon coating was deposited onto the surface of Si particles. The weight ratio of the carbon coating on the silicon particles was 34.5 wt. %.

Cells Assembling and Electrochemical Test

The electrochemical performances of the composite obtained in Example 1 were tested using two-electrode coin-type cells. The working electrodes were prepared by pasting a mixture of the mesoporous Si or the Si/C composite prepared in Example 1 as active material, Super P carbon black (40 nm, Timical) as an electrical conductor and styrene butadiene rubber/sodium carboxymethyl cellulose (SBR/SCMC, 3:5 by weight) as a binder at a weight ratio of 60:20:20. After coating the mixture onto pure Cu foil, the electrodes were dried, cut to Φ 12 mm sheets, pressed at 3 MPa, and then further dried at 50° C. in vacuum for 4 h. The CR2016 coin cells were assembled in an argon-filled glove box (MB-10 compact, MBraun) using 1M $LiPF_6$/EC+DMC (1:1 by volume, ethylene carbonate (EC), dimethyl carbonate (DMC)), plus 2 wt. % vinylene carbonate (VC) as electrolyte, ENTEK ET20-26 as separator, and pure lithium foil as counter electrode. The cycling performances were evaluated on a LAND battery test system (Wuhan Kingnuo Electronics Co., Ltd., China) at 25° C. with a current density of 100 mA·g$^{-1}$ or 300 mA·g$^{-1}$. The cut-off voltage was 0.01V versus Li/Li$^+$ for discharge (Li insertion) and 1.2V versus Li/Li$^+$ for charge (Li extraction). The test results are shown in FIGS. 5-8.

FIG. 1 is a XRD profile of the mesoporous particles and the mesoporous Si/C composite prepared in Example 1. As shown in FIG. 1, for the mesoporous Si particles, the main diffraction peaks at scattering angles (2θ) of about 28.4°, 47.3°, 56.1°, 69.2°, 76.4° correspond to silicon crystallites and the broad peak near 22.4° is attributed to the Super P from the preparation of the mesoporous Si particles. The weight ratio of Super P in the mesoporous Si particles is about 8%. For the Si/C composite, all the peaks are similar with the mesoporous Si particles, while the broad peak near 22.4° is attributed to both of the Super P and carbon (25.3 wt %) by CVD.

FIG. 2 is SEM image of the mesoporous Si/C composite. As shown in FIG. 2, the particles of the Si/C composite are small and distribute uniformly.

FIG. 3 is TEM image of the mesoporous Si/C composite. As showed in FIG. 3, for the Si/C composite, carbon was deposited uniformly on the surface of Si, and the coated carbon is about 8 nm thick.

FIG. 4 is a graph showing the pore size distribution of the mesoporous Si particles. As determined by Brunauer-Emmett-Teller (BET) measurement, the specific surface area of the silicon particles is 73.9 m$^2$·g$^{-1}$. The BET result demonstrates the formation of mesoporous structure in the Si particles. BJH pore size distribution for the Si particles is given in FIG. 4. The two pore size distributions, 2-4 nm and 20-40 nm, may result from etching LiCl and agglomeration, which may accommodate the volume change.

FIG. 5 is the first two discharge/charge curves of the mesoporous Si/C composite at current density of 100 m·Ag$^{-1}$. The coin cell was charged and discharged at 100 mA·g$^{-1}$ between 0.01 and 1.2V vs Li/Li$^+$. The discharge and charge capacity of Si/C composite is 2134 mAh·g$^{-1}$ and 1413 mAh·g$^{-1}$, respectively, with an initial Coulombic efficiency of 66.2% in the initial cycle.

FIG. 6 illustrates the cycling performance of the mesoporous Si/C composite. The coin cell was charged and discharged at a current density of 300 mA·g$^{-1}$ between 0.01 and 1.2V vs Li/Li$^+$. As seen in FIG. 6, the composite delivers a reversible capacity of 1181 mAh·g$^{-1}$ and after 240 cycles the reversible capacity is still up to 977 mAh·g$^{-1}$ with an excellent capacity retention of 82.8%. This excellent cycling performance of the Si/C composite may be ascribed to mesoporous structure of the Si particles and uniform carbon layer, which can suppress part of the volume change.

FIG. 7 illustrates the rate performance of the mesoporous Si/C composite. The cell exhibits a stable reversible capacity of 940 mAh·g$^{-1}$ as the rate increases to 1 C, which shows that no obvious polarization occurs from relative large rate. Upon returning the rate to 0.1 C again, a high reversible capacity of 1294 mAh·g$^{-1}$ is exhibited, which is 93% of the initial reversible capacity at the initial rate of 0.1 C. It can be seen that the Si/C composite exhibits attractive rate capacity and high reversibility in lithium storage.

FIG. 8 illustrates comparison of the cycling performances of the mesoporous Si particles and the Si/C composite prepared in Example 1. The coin cell was charged and discharged at a current density of 100 mA·g$^{-1}$ between 0.01 and 1.2V vs Li/Li$^+$. As shown in FIG. 8, the Si/C composite according to the invention is superior to the mesoporous Si particles in cycling stability and reversible capacity. The good cycling performance of the Si/C composite according to the invention may be ascribed to open mesoporous structure of Si particles and uniform carbon layer, which can suppress part of the volume change. This result can be accorded with TEM as shown in FIG. 3.

While particular embodiments of the present invention have been described, it will be understood by those skilled in the art that various changes and modifications may be made without departing from the spirit and scope of the present invention as defined by the claims and their equivalents.

The invention claimed is:

1. A silicon/carbon composite, comprising:
   mesoporous silicon particles; and
   a carbon coating disposed on the silicon particles, the silicon particles having two pore size distributions of 2-4 nm and 20-40 nm.

2. The composite according to claim 1, wherein the thickness of the carbon coating is 5-10 nm.

3. The composite according to claim 1, wherein the carbon is contained in an amount of 10 to 50% by weight, based on the total weight of the composite.

4. The composite according to claim 1, further comprising carbon black.

5. The composite according to claim 4, wherein the carbon black is contained in an amount of 5.6 to 12.5% by weight, based on the total weight of the composite.

6. The composite according to claim 1, wherein the silicon/carbon composite is configured as an anode material for a lithium ion.

7. The composite according to claim 1, further comprising Super P carbon black.

8. A process of preparing a silicon/carbon composite, comprising:
   preparing mesoporous silicon particles via a mechanochemical reaction between $SiCl_4$ and $Li_3S_4$ under ball milling with agate balls in an agate container or zirconium balls in a zirconium container;
   subjecting the particles to a thermal treatment and a washing process; and
   coating the mesoporous silicon particles with carbon,
   wherein carbon black is used as a dispersing agent added in the mechanochemical reaction, and
   wherein the weight ratio of $Li_{13}S_4$:carbon black:$SiCl_4$ is 0.84:0.05-0.12:2.3-3.4.

9. The process according to claim 8, wherein the milling is performed at a rotation speed of 300-450 rpm for 5-30 hours.

10. The process according to claim 8, wherein the heat treatment is performed at a temperature of 100-900° C. for 0.5-10 hours.

11. The process according to claim 8, wherein the coating with carbon is performed by chemical vapor deposition.

12. The process according to claim 11, wherein the chemical vapor deposition includes:
   introducing the mesoporous silicon particles and a carbon precursor in a furnace,
   increasing the furnace temperature from room temperature to 750-800° C. at a rate of 10° C. min$^{-1}$, and
   keeping the furnace temperature at 750-800° C. for 30-90 min.

13. The process according to claim 12, wherein the carbon precursor is selected from toluene and acetylene.

14. The process according to claim 8, wherein Super P carbon black is used as the dispersing agent.

15. The process according to claim 8, wherein the silicon/carbon composite is configured as an anode material for a lithium ion battery.

16. A lithium ion battery, comprising:
   a silicon/carbon composite as anode material, the silicon/carbon composite including:
   mesoporous silicon particles; and
   a carbon coating disposed on the silicon particles, the silicon particles having two pore size distributions of 2-4 nm and 20-40 nm.

17. The lithium ion battery according to claim 16, wherein the silicon/carbon composite is formed by:
   preparing the mesoporous silicon particles via a mechanochemical reaction between $SiCl_4$ and $Li_{13}S_4$ under balling milling with agate balls in an agate container or zirconium balls in a zirconium container;
   subjecting the particles to a thermal treatment and a washing process; and
   coating the mesoporous silicon particles with carbon.

* * * * *